Feb. 17, 1931. H. O. SIEGMUND 1,792,552
METHOD OF FORMING CONTACTS
Filed Nov. 27, 1928
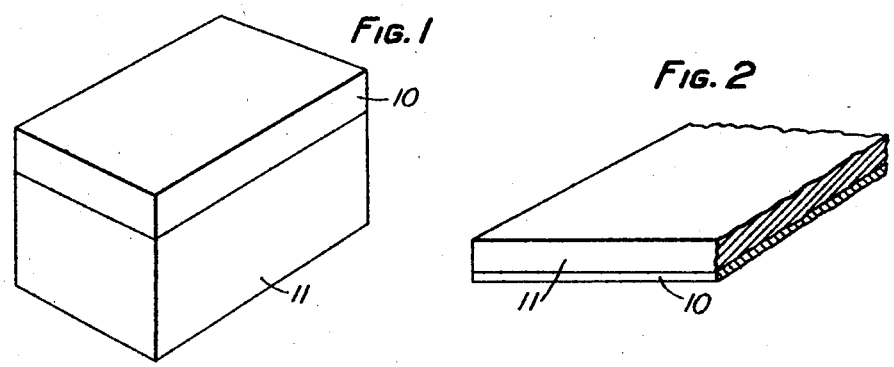
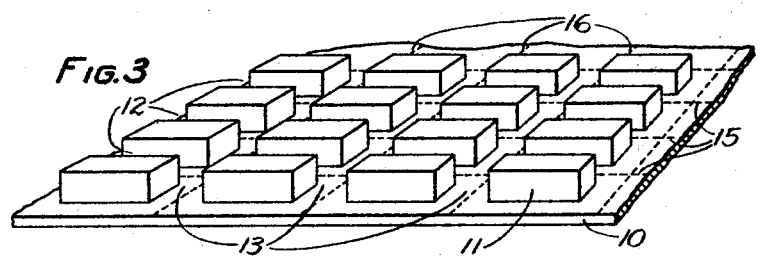
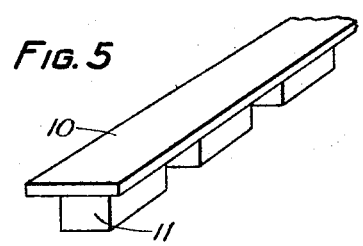
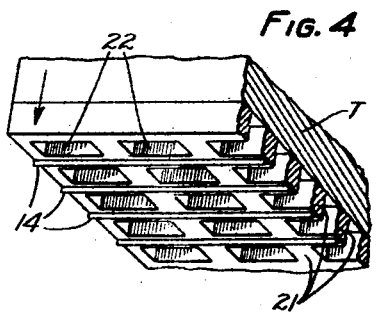
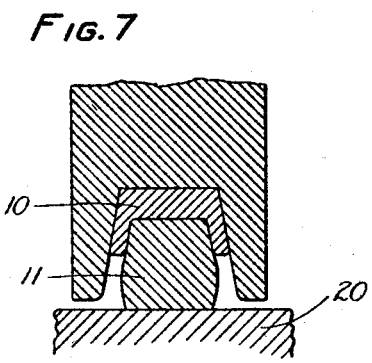
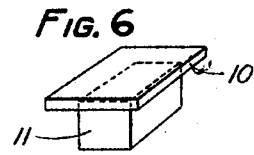
INVENTOR
H. O. SIEGMUND
BY Irving MacDonald
ATTORNEY Patented Feb. 17, 1931

1,792,552

UNITED STATES PATENT OFFICE

HUMPHREYS O. SIEGMUND, OF WEST ORANGE, NEW JERSEY, ASSIGNOR TO BELL TELEPHONE LABORATORIES, INCORPORATED, OF NEW YORK, N. Y., A CORPORATION OF NEW YORK

METHOD OF FORMING CONTACTS

Application filed November 27, 1928. Serial No. 322,271.

This invention relates to contacts for electrical switching apparatus and more particularly to a bi-metallic contact having a base of contact metal, such as platinum, of the proper thickness to give the required contact life, and a backing of base metal, to give the material the necessary thickness to provide adequate spacing between contact springs.

In accordance with this invention, a bi-metallic contact is formed by uniting contact metal to base metal as a foundation, the contact metal being so formed as to overlap the base metal to facilitate the formation of an apron on the sides of the base metal to prevent smutting of the contact metal from side sparking. These contacts are preferably produced by soldering with silver solder or other suitable soldering alloy an ingot of contact metal to an ingot of base metal and rolling the resulting bi-metallic block down to the required dimension in a manner to produce indentations at right angles to each other in the base metal from which the contacts may be cut and welded to their supporting members after which the apron may be formed around the base metal.

In the drawings Fig. 1 is a view of a bi-metallic ingot made of precious and base metal before the rolling operation;

Fig. 2 is a view of the bi-metallic ingot after the rolling operation;

Fig. 3 is a view of the bi-metallic plate showing indentations formed in the base metal;

Fig. 4 is an example of a tool suitable for use for the forming of the indentations shown in the plate of Fig. 3;

Fig. 5 is a view of a tape of contacts slit from the plate shown in Fig. 3;

Fig. 6 is a view of a contact slit from the tape shown in Fig. 5 ready for welding on its supporting member; and Fig. 7 is a cross-sectional view of the contact after the apron forming operation, showing the forming tool for effecting such operation in position thereon.

In the construction of the contacts of this invention the ingot 10 of precious or contact metal shown in Fig. 1, is united as by welding or otherwise to the base metal block 11 after which the bi-metallic block thus formed may be rolled down in any well-known manner to form a bi-metallic sheet as shown in Fig. 2 of the required thickness. This bi-metallic sheet or plate may then be put on an ordinary press fitted with the forming tool T shown in Fig. 4, for forming the indentations 12 and 13 in the base metal at right angles to each other. In this forming tool the thickness of the walls 21 determine the width of grooves 12 and 13 and the size of the cavities 22 which in turn determine the size of the metallic blocks 11 after the forming operation.

The tool T is preferably provided with parallel ridges or knife blades 14 adapted for slitting the precious metal sheet simultaneously with the forming of the indentations. These blades are disposed along the longitudinal axis of grooves 12 as indicated by the dotted lines 15 shown in Fig. 3, thus obtaining a tape of contacts as shown in Fig. 5. This tape may in turn be slit transversely along the dotted lines 16 to produce contact blanks as shown in Fig. 6. These contact blanks are then secured to suitable supporting members or springs 20 as shown in Fig. 7 as by welding. The precious metal which overlaps the base metal may then be bent downwardly in order to form on all sides of the base metal block 11 a sparking protecting apron.

It is obvious that by the use of proper forming tools the effective or contacting portion of the precious metal may be given a flat surface as shown in Fig. 7 or any other desired configuration, depending upon the type of electrical apparatus to which these contacts may form a part.

What is claimed is:

1. The method of making contact elements comprising uniting an ingot of contact metal to an ingot of base metal, rolling the resulting bi-metallic block to the required dimensions and forming recesses in the base metal, slitting the precious metal into tape, cutting contacts therefrom and attaching the contacts to springs and forming the same so that an apron of contact metal partially covers the sides of the base metal.

2. The method of making contact elements comprising uniting an ingot of contact metal to an ingot of base metal, rolling the resulting bi-metallic block to the required dimensions and forming recesses at right angles to each other in the base metal, slitting the precious metal into tape, cutting contacts therefrom and attaching the contacts to springs and forming the same so that an apron of contact metal partially covers the sides of the base metal.

In witness whereof, I hereunto subscribe my name this 23d day of November, 1928.

HUMPHREYS O. SIEGMUND.